US012374262B1

(12) United States Patent
Wu

(10) Patent No.: US 12,374,262 B1
(45) Date of Patent: Jul. 29, 2025

(54) TIMING CONTROLLER, DISPLAY WITH BRIGHTNESS COMPENSATION FUNCTION AND PIXEL BRIGHTNESS COMPENSATION METHOD

(71) Applicant: HIMAX TECHNOLOGIES LIMITED, Tainan (TW)

(72) Inventor: Tung Ying Wu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 18/773,572

(22) Filed: Jul. 15, 2024

(51) Int. Cl.
*G09G 3/20* (2006.01)

(52) U.S. Cl.
CPC ..... *G09G 3/2092* (2013.01); *G09G 2320/041* (2013.01); *G09G 2320/046* (2013.01); *G09G 2320/048* (2013.01)

(58) Field of Classification Search
CPC ........... G09G 3/2092; G09G 2320/041; G09G 2320/046; G09G 2320/048
See application file for complete search history.

(56) References Cited

U.S. PATENT DOCUMENTS

| | | | | |
|---|---|---|---|---|
| 8,884,993 | B2 * | 11/2014 | Yamashita | G09G 3/3233 315/169.3 |
| 9,047,812 | B2 * | 6/2015 | Chun | G09G 3/20 |
| 10,580,358 | B2 * | 3/2020 | Kuki | G09G 3/2007 |
| 2019/0362671 | A1 * | 11/2019 | Kuki | G09G 3/2007 |

* cited by examiner

*Primary Examiner* — Gene W Lee
(74) *Attorney, Agent, or Firm* — CKC & Partners Co., LLC

(57) ABSTRACT

The disclosure provides a pixel brightness compensation method, including: obtaining a current grayscale value of a pixel in a display and an accumulated operating time, a current temperature, and a current display brightness value of the display; determining a first gain value and a third gain value according to the current grayscale value, the current temperature and the accumulated operating time; generating a second gain value according to the current display brightness value; and converting the current grayscale value to a target grayscale value for the pixel by the first gain value, the second gain value, and the third gain value.

16 Claims, 6 Drawing Sheets

L1

| Accumulated Operating Time / Temperature | $C_1$ | $C_2$ | … | $C_{17}$ |
|---|---|---|---|---|
| $T_1$ | 1 | 1 | … | 0.8 |
| $T_2$ | 1 | 1 | … | 0.85 |
| … | … | … | … | … |
| $T_{17}$ | 0.95 | 0.92 | … | 0.76 |

A1

A1

FIG. 2

L2

| DBV(%) | A2 |
|---|---|
| 0 | 1 |
| 16 | 0.99 |
| • • • | • • • |
| 100 | 0.8 |

FIG. 3

L3

| Grayscale Value \ Accumulated Operating Time | $C_1$ | $C_2$ | • • • | $C_{17}$ |
|---|---|---|---|---|
| $G_1$ | 1 | 1 | • • • | 0.8 |
| $G_2$ | 1 | 1 | • • • | 0.85 |
| • • • | • • • | • • • | • • • | • • • |
| $G_{17}$ | 0.95 | 0.92 | • • • | 0.76 |

A3

A3

FIG. 4

TIMING CONTROLLER, DISPLAY WITH BRIGHTNESS COMPENSATION FUNCTION AND PIXEL BRIGHTNESS COMPENSATION METHOD

BACKGROUND

Technical Field

The disclosure relates to a timing controller, a display with brightness compensation function, and a pixel brightness compensation method, and more particularly to a timing controller, a display with brightness compensation function, and a pixel brightness compensation method for compensating the brightness of the pixels of the display.

Description of Related Art

The burn-in effect is a phenomenon that an image is stuck on the display screen, and usually can be found in a display that has operated (in the display mode) for a long time. A known method for preventing the burn-in effect is to compensate the brightness of the pixels by de-burn-in technology for directly compensating the brightness of the pixels in the display. However, the brightness of the pixels will decrease as an accumulated operating time of the display increases. If the brightness of the pixel is directly compensated to an initial brightness, a driving current of the pixel will increase accordingly, which will also increase the operating temperature and accelerate aging of the display.

SUMMARY

A pixel brightness compensation method is provided. The pixel brightness compensation method includes obtaining a current grayscale value of a pixel in a display and an accumulated operating time and a current temperature of the display; determining a first gain value and a third gain value according to the current grayscale value, the current temperature and the accumulated operating time; generating a second gain value according to a current display brightness value of the display; and converting the current grayscale value to a target grayscale value for the pixel by the first gain value, the second gain value, and the third gain value.

A timing controller with brightness compensation function is provided. The timing controller includes a brightness control module. The brightness control module is configured to receive a current grayscale value of a pixel in a display, obtain an accumulated operating time of the display, determine a first gain value and a third gain value according to the current grayscale value of the pixel, a current temperature of the display and the accumulated operating time of the display, generate a second gain value according to a current display brightness value of the display, and convert the current grayscale value to a target grayscale value for the pixel by the first gain value, the second gain value, and the third gain value.

A display with brightness compensation function is provided. The display includes a display panel and a timing controller. The display panel includes a pixel. The timing controller is electrically connected to the display panel and includes a brightness control module configured to receive a current grayscale value of the pixel in the display panel, obtain an accumulated operating time of the display, determine a first gain value and a third gain value according to the current grayscale value of the pixel, a current temperature of the display panel and the accumulated operating time, generate a second gain value according to a current display brightness value of the display panel, and convert the current grayscale value to a target grayscale value for the pixel by the first gain value, the second gain value, and the third gain value.

BRIEF DESCRIPTION OF THE DRAWINGS

FIG. 2 is a first lookup table showing a relationship between temperature values, accumulated operating time values and first gain values in accordance with an embodiment of the present disclosure.

FIG. 3 is a second lookup table showing a relationship between display brightness values and second gain values in accordance with an embodiment of the present disclosure.

FIG. 4 is a third lookup table showing a relationship between grayscale values, the accumulated operating time values and third gain values in accordance with an embodiment of the present disclosure.

DETAILED DESCRIPTION

Figure 1:
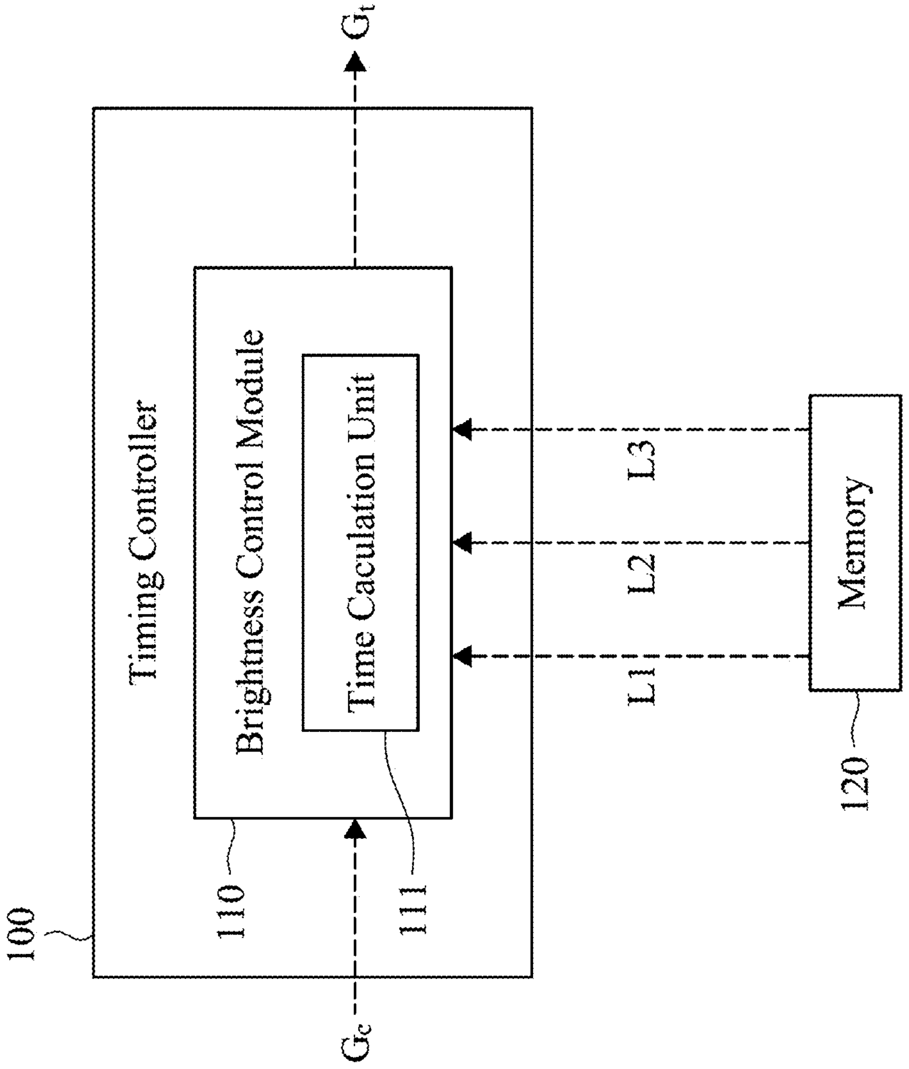
FIG. 1 is a schematic diagram showing a timing controller with brightness compensation function in accordance with an embodiment of the present disclosure.

Referring to FIG. 1, FIG. 1 is a schematic diagram showing a timing controller 100 with brightness compensation function in accordance with an embodiment of the present disclosure. The timing controller 100 includes a brightness control module 110. The brightness control module 110 is configured to convert a current grayscale value $G_c$ to a target grayscale value $G_t$ for each pixel arranged on a display panel in accordance with an accumulated operating time $C_a$, a current temperature $T_c$, and a current display brightness value DBV of the display panel.

The current grayscale value Ge of the pixel, the current temperature $T_c$ and the accumulated operating time $C_a$ of the display panel are used to determine a first gain value A1 and a third gain value A3, and the current display brightness value DBV of the display panel is used to generate a second gain value A2. In some embodiments, the first gain value A1 is determined according to the current temperature $T_c$ and the accumulated operating time $C_a$, and the third gain value A3 is determined according to the current grayscale value $G_c$ and the accumulated operating time $C_a$. In some embodiments, the first gain value A1 is determined according to the current grayscale value $G_c$ and the current temperature $T_c$, and the third gain value A3 is determined according to the current grayscale value $G_c$ and the accumulated operating time $C_a$. The target grayscale values $G_t$ for the pixels on the display panel can be calculated from the first gain value A1, the second gain value A2, and the third gain value A3.

The pixel emits the target brightness based on the target grayscale value $G_t$, such that the target brightness of the pixel can be kept within a brightness range after the display panel displays for a target accumulated operating time. In one exemplary example, the target brightness emitted by the pixel based on the target grayscale value $G_t$ is maintained at 80% of the maximum brightness of the display panel after the display panel displays for the target accumulated operating time of 100 hours.

The brightness compensation of the pixel is related to a temperature and a driving current of the pixel. If the brightness of the pixel is directly compensated to an initial brightness when the pixel was initially lit, a larger driving current is required, which increases the temperature of the pixel and accelerates its aging rate.

As shown in FIG. 1, the brightness control module 110 is configured to receive the current grayscale value $G_c$ of the pixel. The brightness control module 110 includes a time calculation unit 111 which is configured to calculate the accumulated operating time $C_a$ of the display panel. The accumulated operating time $C_a$ is the accumulated time of the display panel in the display mode. In some embodiments, the accumulated operating time $C_a$ can be obtained by calculating the time of each frame displayed on the display panel.

The brightness control module 110 is further configured to generate the first gain value A1 according to the current temperature $T_c$ and the accumulated operating time $C_a$, generate the second gain value A2 according to the current display brightness value DBV of the display panel, generate the third gain value A3 according to the current grayscale value $G_c$ and the accumulated operating time $C_a$, and calculate the target grayscale value $G_t$ in accordance with the first gain value A1, the second gain value A2, and the third gain value A3. Therefore, the compensator (not shown) can generate a control signal according to the target grayscale value $G_t$ for compensating the brightness of the pixel to the target brightness.

In some embodiments, the display includes a temperature sensor (not shown) that is configured to detect the current temperature $T_c$ of the display panel. In some embodiments, the temperature sensor is disposed outside the display panel. In some embodiments, the temperature sensor is embedded in the display panel and next to the pixels for obtaining the current temperature $T_c$.

The memory 120 is configured to store a first lookup table L1 for determining the first gain value A1, a second lookup table L2 for determining the second gain value A2, and a third lookup table L3 for determining the third gain value A3. In some embodiments, the memory 120 may be disposed within the timing controller 100, and the disclosure is not limit thereto.

As shown in FIG. 2, the first lookup table L1 includes values corresponding to temperature values $T_1$ to $T_{17}$ and accumulated operating time values $C_1$ to $C_{17}$ for determining the first gain value A1. For example, in a case in which the current temperature $T_c$ of the display panel is $T_{17}$ and the accumulated operating time $C_a$ is $C_2$, according to the first lookup table L1, the first gain value A1 is determined to be 0.92.

The size of first lookup table L1 shown in FIG. 2 is 17×17. However, the size of the first lookup table L1 may be adjusted according to design requirements of the display panel and is not limited to that shown in FIG. 2. In addition, in a case in which the first lookup table L1 does not include the current temperature $T_c$ and/or the accumulated operating time $C_a$, the first gain value A1 may be determined by performing interpolation (e.g., linear interpolation or non-linear interpolation) from the first lookup table L1.

As shown in FIG. 3, the second lookup table L2 includes values corresponding to display brightness values DBV (%) for determining the second gain value A2. The display brightness values are expressed as percentage values for representing the percentage of the current brightness relative to the maximum brightness of the display panel. For example, in a case in which the display brightness value DBV (%) of the display panel is 100%, according to the second lookup table L2, the second gain value A2 is determined to be 0.8.

The size of the second lookup table L2 may be adjusted according to design requirements of the display panel and is not limited to that shown in FIG. 3. In addition, in a case in which the second lookup table L2 does not include the current display brightness value DBV, the second gain value A2 may be determined by performing interpolation (e.g., linear interpolation or non-linear interpolation) from the second lookup table L2.

As shown in FIG. 4, the third lookup table L3 includes values corresponding to grayscale values $G_1$ to $G_{17}$ and the accumulated operating time values $C_1$ to $C_{17}$ for determining the third gain values A3. For example, in a case in which the current grayscale value $G_c$ of the pixel is $G_{17}$ and the accumulated operating time $C_a$ is $C_1$, according to the third lookup table L3, the third gain value A3 is determined to be 0.95.

The size of the third lookup table L3 shown in FIG. 4 is 17×17. However, the size of the third lookup table L3 may be adjusted according to design requirements of the display panel and is not limited to that shown in FIG. 4. In addition, in a case in which the third lookup table L3 does not include the current grayscale value $G_t$ and/or the accumulated operating time $C_a$, the third gain value A3 may be determined by performing interpolation (e.g., linear interpolation or non-linear interpolation) from the third lookup table L3.

In the embodiments of the disclosure, the first gain value A1, the second gain value A2, and the third gain value A3 are less than or equal to 1, allowing the pixel to be compensated to the target brightness (based on the target grayscale value $G_t$) rather than the initial brightness. Therefore, the brightness of the pixels can be kept within the brightness range after the display panel displays for the target accumulated operating time, and the aging rate of the pixels can be slowed down as well.

Each pixel includes a red sub-pixel, a green sub-pixel, and a blue sub-pixel. In such embodiments, the first gains A1, the second gains A2, and the third gains A3 of the red sub-pixel, the green sub-pixel, and the blue sub-pixel can be determined from the first lookup table L1, the second lookup table L2 and the third lookup table L3, and the current grayscale values $G_c$ of the red sub-pixel, the green sub-pixel, and the blue sub-pixel can be converted to the target grayscale values $G_t$, respectively.

In some embodiments, the red sub-pixel, the green sub-pixel, and the blue sub-pixel have their own first lookup table L1, the second lookup table L2 and the third lookup table L3, such that the first gain values A1 of the red sub-pixel, the green sub-pixel and the blue sub-pixel are different, the second gain values A2 of the red sub-pixel, the green sub-pixel and the blue sub-pixel are different, and the third gain values A3 of the red sub-pixel, the green sub-pixel and the blue sub-pixel are different.

Figure 5:
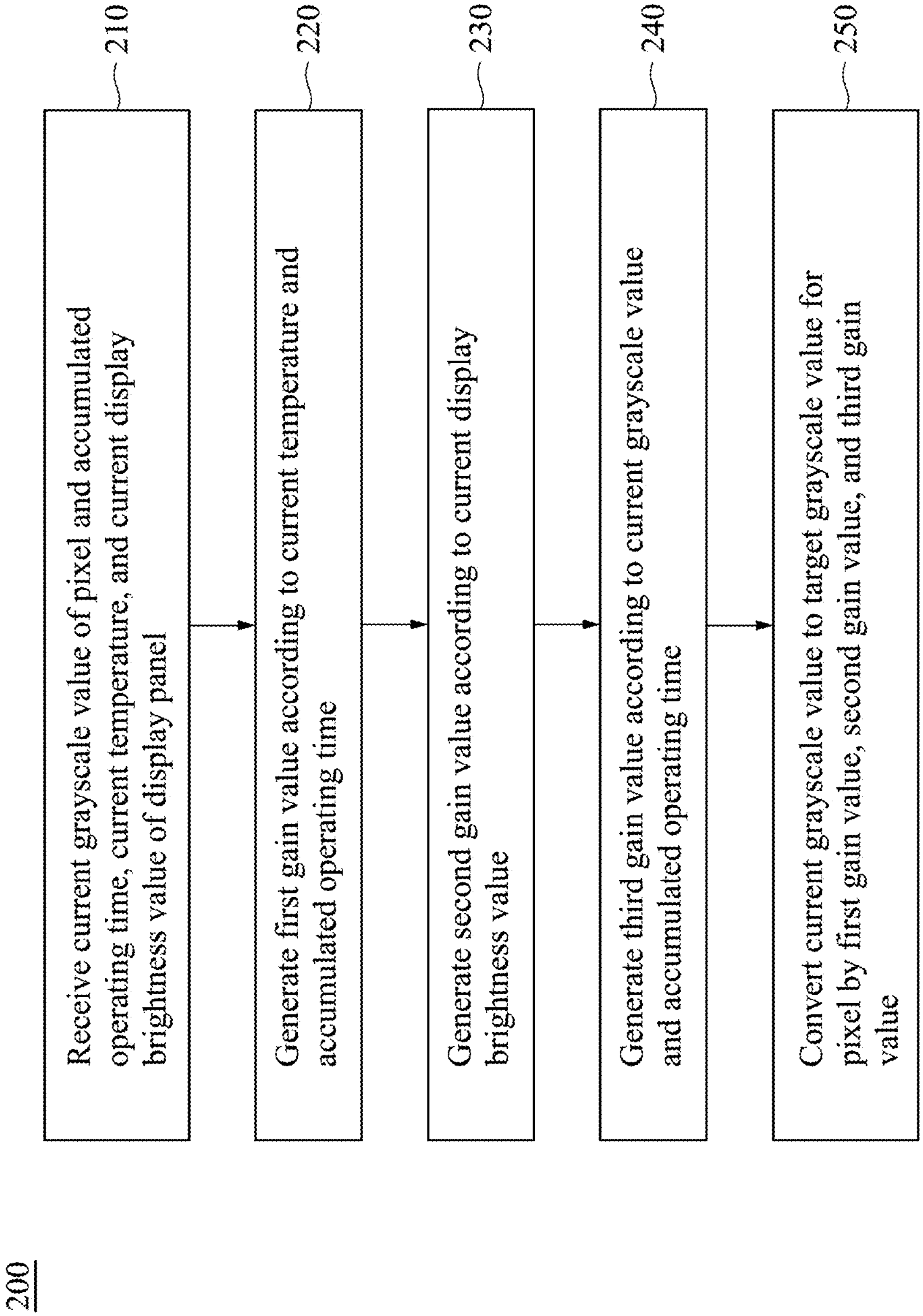
FIG. 5 is a schematic diagram showing a pixel brightness compensation method in accordance with an embodiment of the present disclosure.

Referring to FIG. 5, FIG. 5 is a schematic diagram showing a pixel brightness compensation method 200 in accordance with an embodiment of the present disclosure. The pixel brightness compensation method 200 includes Steps 210 to 250 and may be applied to the configuration shown in FIG. 1 or another similar configuration. The configuration shown in FIG. 1 is taken as an example for the following description.

In Step 210, the brightness control module 110 receives the current grayscale value $G_c$ of the pixel and the accumulated operating time $C_a$, the current temperature $T_c$, and the current display brightness value DBV of the display panel. In Step 220, the brightness control module 110 generates the first gain value A1 according to the current temperature $T_c$ and the accumulated operating time $C_a$. As mentioned before, the first gain value A1 also can be generated according to the current grayscale value $G_c$ and the current temperature $T_c$. In Step 230, the brightness control module 110 generates the second gain value A2 according to the current display brightness value DBV. In Step 240, the brightness control module 110 generates the third gain value A3 according to the current grayscale value $G_c$ and the accumulated operating time $C_a$. In Step 250, the current grayscale value $G_c$ of the pixel is converted to the target grayscale value $G_t$ according to the first gain value A1, the second gain value A2, and the third gain value A3. It should be understood that Steps 220 and 240 can be performed simultaneously or in a changed order, and the present disclosure is not limited thereto.

In the embodiments of the disclosure, for a single pixel, the brightness control module 110 receives the current grayscale values $G_c$, the accumulated operating time $C_a$ and the current display brightness value DBV of the red sub-pixel, the green sub-pixel and the blue sub-pixel in Step 210. Then, the first gain value A1, the second gain value A2 and the third gain value A3 are found for the red sub-pixel, the first gain value A1, the second gain value A2 and the third gain value A3 are found for the green sub-pixel, and the first gain value A1, the second gain value A2 and the third gain value A3 are found for the blue sub-pixel from the first lookup table L1, the second lookup table L2, and the third lookup table L3 in Steps 220 to 240. Then, the current grayscale values $G_c$ of the red sub-pixel, the green sub-pixel and the blue sub-pixel can be converted to the target grayscale values $G_t$ based on their first gains A1, the second gains A2, and the third gains A3.

In the following example, the first gain value A1, the second gain value A2 and the third gain value A3 of the red sub-pixel are respectively expressed as the first gain value $A1_R$, the second gain value $A2_R$, and the third gain value $A3_R$. The first gain value A1, the second gain value A2 and the third gain value A3 of the green sub-pixel are respectively expressed as the first gain value $A1_G$, the second gain value $A2_G$, and the third gain value $A3_G$. The first gain value A1, the second gain value A2 and the third gain value A3 of the blue sub-pixel are respectively expressed as the first gain value $A1_B$, the second gain value $A2_B$, and the third gain value $A3_B$.

The equation of the target grayscale value R' of the red sub-pixel is as follows:

$$R'=R\times A1_R\times A2_R\times A3_R$$

The equation of the target grayscale value G' of the green sub-pixel is as follows:

$$G'=G\times A1_G\times A2_G\times A3_G$$

The equation of the target grayscale value B' of the blue sub-pixel is as follows:

$$B'=B\times A1_B\times A2_B\times A3_B$$

Based on the above equations, the current grayscale value R of the red sub-pixel, the current grayscale value G of the green sub-pixel, and the current grayscale value B of the blue sub-pixel of each pixel can be converted to the target grayscale values (R', G' and B'). By performing the pixel brightness compensation method 200, the brightness of each pixel can be kept within the brightness range after the display panel displays for the target accumulated operating time, and the aging rate of the pixels can be slowed down as well.

In some embodiments, when the current temperature $T_c$ and the accumulated operating time $C_a$ does not correspond to the temperature values ($T_1$ to $T_{17}$) and/or the accumulated operating time values ($C_1$ to $C_{17}$) stored in the first lookup table L1, the Steps 220 further includes performing interpolation (e.g., linear interpolation or non-linear interpolation) to obtain the first gain value A1 from the first lookup table L1.

In some embodiments, when the current display brightness value DBV of the display panel does not correspond to the display brightness values (DBV %) stored in the second lookup table L2, the Steps 230 further includes performing interpolation (e.g., linear interpolation or non-linear interpolation) to obtain the second gain value A2 from the second lookup table L2.

In some embodiments, when the current grayscale value $G_c$ and the accumulated operating time $C_a$ does not correspond to the grayscale values ($G_1$ to $G_{17}$) and/or the accumulated operating time values ($C_1$ to $C_{17}$) stored in the third lookup table L3, the Step 240 further includes performing interpolation (e.g., linear interpolation or non-linear interpolation) to obtain the third gain value A3 from the third lookup table L3.

Figure 6:
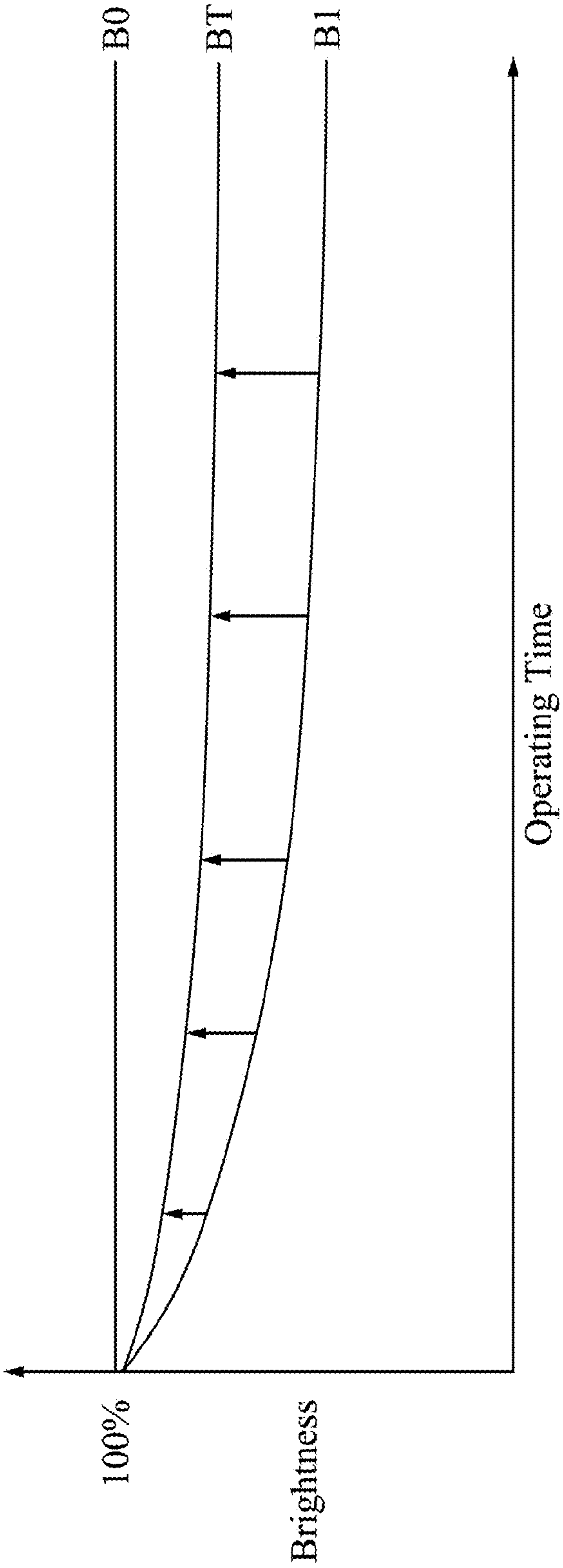
FIG. 6 is a schematic diagram showing relationship between brightness and operating time of a pixel under an ideal condition, an actual condition and a target condition in accordance with an embodiment of the present disclosure.

Referring to FIG. 6, FIG. 6 further illustrates curves B0, B1, and BT to show relationship between the brightness and the operating time of the pixel under an ideal condition, an actual condition, and a target condition respectively. Under the ideal condition represented as the curve B0, the brightness of the pixel will not decrease as the operating time increases. However, the brightness of the pixel will actually decrease as the operating time increases, which is represented as the curve B1. As mentioned before, considering the lifetime of the pixel, the brightness of the pixel only need to be compensated to the target brightness represented as the curve BT, rather than the initial brightness represented as the curve B0. Therefore, the aging rate of the pixel can be slowed down, and the brightness of the pixel can also be kept within the brightness range after the display panel displays for the target accumulated operating time.

Although the description provided above is of various embodiments of the disclosure, this should not limit the scope of the disclosure. Those with ordinary skill in the art can make various modifications without departing from the spirit and scope of the disclosure. Therefore, the scope of protection of the present disclosure shall be determined by the following claims.

What is claimed is:

1. A pixel brightness compensation method, comprising:

obtaining a current grayscale value of a pixel in a display and an accumulated operating time, a current temperature, and a current display brightness value of the display;

determining a first gain value and a third gain value according to the current grayscale value, the current temperature and the accumulated operating time, wherein the first gain value is determined according to the current temperature and either the accumulated operating time or the current grayscale value, and the third gain value is determined according to the current grayscale value and the accumulated operating time;

generating a second gain value according to the current display brightness value; and converting the current grayscale value to a target grayscale value for the pixel by the first gain value, the second gain value, and the third gain value.

2. The pixel brightness compensation method of claim 1, wherein the first gain value, the second gain value, and the third gain value are less than or equal to 1.

3. The pixel brightness compensation method of claim 1, wherein the third gain value is obtained by referring to a third lookup table with a plurality of grayscale values and a plurality of time values.

4. The pixel brightness compensation method of claim 3, wherein the third gain value is obtained by performing interpolation from the third lookup table.

5. The pixel brightness compensation method of claim 1, wherein, when the first gain value is determined according to the current temperature and the accumulated operating time, the first gain value is obtained by referring to a first lookup table with a plurality of temperature values and a plurality of time values.

6. The pixel brightness compensation method of claim 5, wherein the first gain value is obtained by performing interpolation from the first lookup table.

7. The pixel brightness compensation method of claim 1, wherein the second gain value is obtained by referring to a second lookup table with a plurality of display brightness values.

8. The pixel brightness compensation method of claim 7, wherein the second gain value is obtained by performing interpolation from the second lookup table.

9. A timing controller with brightness compensation function, comprising:

a brightness control module configured to:

receive a current grayscale value of a pixel in a display;

obtain an accumulated operating time of the display;

determine a first gain value and a third gain value according to the current grayscale value of the pixel, a current temperature and the accumulated operating time of the display, wherein the first gain value is determined according to the current temperature and either the accumulated operating time or the current grayscale value, and the third gain value is determined according to the current grayscale value and the accumulated operating time;

generate a second gain value according to a current display brightness value of the display; and convert the current grayscale value to a target grayscale value for the pixel by the first gain value, the second gain value, and the third gain value.

10. The timing controller of claim 9, wherein, when the first gain value is determined according to the current temperature and the accumulated operating time, the first gain value is obtained from a first lookup table with a plurality of temperature values and a plurality of time values stored in a memory.

11. The timing controller of claim 10, wherein the second gain value is obtained from a second lookup table with a plurality of display brightness values stored in the memory.

12. The timing controller of claim 11, wherein the third gain value is obtained from a third lookup table with a plurality of grayscale values and the plurality of time values stored in the memory.

13. The timing controller of claim 12, wherein the first gain value, the second gain value, and the third gain value are obtained by performing interpolation from the first lookup table, the second lookup table, and the third lookup table, respectively.

14. The timing controller of claim 11, wherein the first gain value, the second gain value, and the third gain value are less than or equal to 1.

15. The timing controller of claim 11, wherein the brightness control module further comprises:

a time calculation unit configured to obtain the accumulated operating time of the display.

16. A display with brightness compensation function, comprising:

a display panel having a pixel; and a timing controller electrically connected to the display panel and comprising a brightness control module configured to:

receive a current grayscale value of the pixel on the display panel;

obtain an accumulated operating time of the display panel;

determine a first gain value and a third gain value according to the current grayscale value of the pixel, a current temperature of the display panel and the accumulated operating time, wherein the first gain value is determined according to the current temperature and either the accumulated operating time or the current grayscale value, and the third gain value is determined according to the current grayscale value and the accumulated operating time;

generate a second gain value according to a current display brightness value of the display panel; and convert the current grayscale value to a target grayscale value for the pixel by the first gain value, the second gain value, and the third gain value.

* * * * *